United States Patent [19]

Cassimally

[11] E Re. 28,757

[45] Reissued Apr. 6, 1976

[54] TROLLEY CASE

[76] Inventor: Khalil Ahmad Ibrahim Cassimally, 210-Third St. West, Roundup, Mont. 59072

[22] Filed: Aug. 1, 1974

[21] Appl. No.: 493,744

Related U.S. Patent Documents

Reissue of:

[64] Patent No.: 3,709,513
Issued: Jan. 9, 1973
Appl. No.: 100,033
Filed: Dec. 21, 1970

[30] Foreign Application Priority Data

| | | |
|---|---|---|
| Dec. 24, 1969 | United Kingdom | 62764/69 |
| Feb. 24, 1970 | United Kingdom | 8784/70 |
| June 12, 1970 | United Kingdom | 28541/70 |
| June 22, 1970 | United Kingdom | 30072/70 |

[52] U.S. Cl. ..... 280/37
[51] Int. Cl.[2] ..... B62B 11/00
[58] Field of Search ..... 280/37, 38, 39, 36 R, 24; 190/18 A

[56] References Cited

UNITED STATES PATENTS

| | | | |
|---|---|---|---|
| 1,125,441 | 1/1915 | Balley | 280/37 |
| 2,581,417 | 1/1952 | Jones | 190/18 A |
| 2,732,218 | 1/1956 | Resch | 280/38 |

FOREIGN PATENTS OR APPLICATIONS

| | | | |
|---|---|---|---|
| 573,486 | 3/1924 | France | 280/37 |
| 867,582 | 10/1940 | France | 280/37 |

*Primary Examiner*—Robert R. Song
*Attorney, Agent, or Firm*—Wegner, Stellman, McCord, Wiles & Wood

[57] ABSTRACT

A collapsible trolley which in its collapsed condition can be used as a portable case and more particularly to a trolley of the type in which the wheels and a handle framework can be folded into a position in which they are compactly contained adjacent the sides of the case or into a position in which the case and the wheeled handle framework form a trolley adapted to receive and support additional cases or luggage.

19 Claims, 7 Drawing Figures

INVENTOR
KHALIL A. I. CASSIMALLY

BY
Sandoe, Hopgood & Calimafde
ATTORNEYS

INVENTOR
KHALIL A.I. CASSIMALLY
BY
Sandoe, Hopgood & Calimafde
ATTORNEYS

TROLLEY CASE

Matter enclosed in heavy brackets [ ] appears in the original patent but forms no part of this reissue specification; matter printed in italics indicates the additions made by reissue.

BACKGROUND TO THE INVENTION

It is known to provide a trunk or large suitcase with a pair of wheels at one end and with a handle at the other end so that the trunk can be drawn along easily, or trundled on the wheels. In some instances it has been known to provide a trunk of this kind with wheels which fold up into the trunk when not is use. It is also known to provide upstanding lugs at the wheeled end of the trunk so that other baggage can be placed on top of the trunk.

In all of the known devices of this kind however, the wheeled trunk has been relatively large and the additional baggage has always been carried on top of the trunk itself. This has several disadvantages, namely that the wheeled trunk cannot be easily carried when not in use as a trolley and that the amount of additional luggage that can be transported is very limited.

It is an object of the present invention to overcome these disadvantages by providing a relatively small case with a wheeled framework which can be used as a trolley to carry a substantial amount of additional baggage.

STATEMENT OF THE INVENTION

According to one aspect of the present invention there is provided a collapsible trolley comprising a case and a jointed framework pivotally attached to the case, wherein the framework includes a handle and a pair of wheels and is pivotable into a closed position in which the framework is folded and located at the sides of the case and into an open position in which the wheels project below the case and the framework projects outwardly from the case in a locked condition to form a wheeled trolley with the case forming the foot of the trolley and adapted to retain in place luggage supported on the framework.

Preferably, the framework comprises two side bars each having inner and outer portions which are hinged together and a cross-bar joining the outer ends of the outer portions of the side bars, the inner portions of the side bars being pivotally mounted on the sides of the case and the wheels being fixedly mounted on the said inner portions of the side bars for pivotal movement therewith.

Preferably, also, the case is provided with recesses at each side which are open on two sides to receive and house the framework and the wheels in the closed, folded position.

DESCRIPTION OF THE PREFERRED EMBODIMENTS

Figure 1:
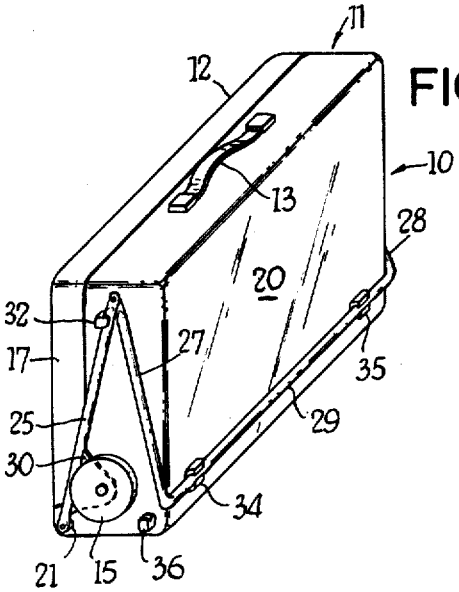
FIG. 1 is a perspective view of a collapsible trolley in accordance with the present invention showing the handle framework in a folded position.
Figure 2:
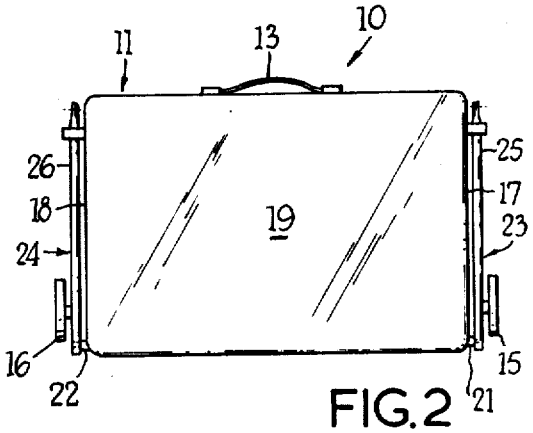
FIG. 2 is an elevation of the trolley shown in FIG. 1.

In FIGS. 1 to 4 a collapsible trolley forming one embodiment of the present invention is indicated generally at 10. The trolley 10 comprises a case 11, which forms the foot of the trolley and which is of conventional construction having a hinged lid 12 and a handle 13, and a framework 14 which carries wheels 15 and 16.

The case 11 has side faces 17 and 18 and top and bottom major faces 19 and 20. Projecting outwardly from the side faces 17 and 18 are two aligned pins 21 and 22, which can if required comprise the opposite ends of a single rod forming an integral part of the structure of the case. Alternatively, the pins 21 and 22 can be separate and each mounted in any convenient manner, on the side faces 17 and 18 of the case.

The framework 14 comprises two side bars 23 and 24 each of which comprises an inner side bar 25 and 26 respectively and an outer side bar 27 and 28 respectively. The inner side bars 25 and 26 are pivotally mounted on the pins 21 and 22 and the outer side bars 27 and 28, which are formed integrally with a handle 29, are hinged to the inner side bars 25 and 26. The wheels 15 and 16 are mounted so as to be free-running, on lugs 30 and 31 which are integral with the inner side bars 25 and 26. The wheels 15 and 16 are positioned closely adjacent the pins 21 and 22.

If the trolley 10 is not in use or is being carried by hand as a case then the framework 14 is folded away into the closed position shown in FIG. 1, in which the wheels 15 and 16 and the side bars 23 and 24 are located adjacent the side faces 17 and 18 of the case and the handle 29 extends across the bottom major face 20 of the case. Resilient clips 32 and 33 are provided on the side faces 17 and 18 respectively to hold the inner side bars 25 and 26 in the folded position and similar clips 34 and 35 are provided on the major face 20 to hold the handle 29. When the framework 14 is in the folded position the wheeled case 10 can be used as a conventional suitcase or briefcase and can be easily handled and transported.

Figure 3:
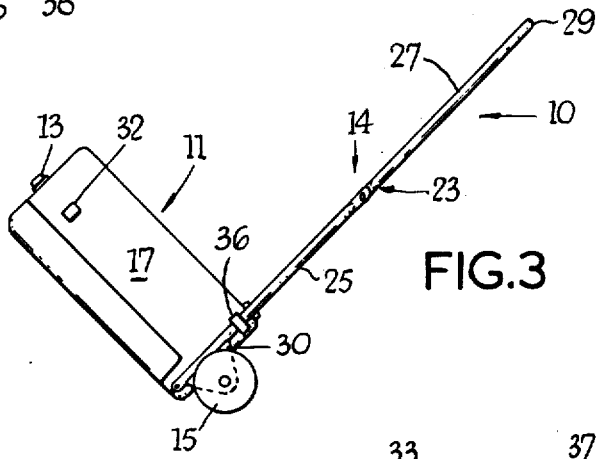
FIG. 3 is a side view of the trolley of FIGS. 1 and 2 but showing the framework in its open position.
Figure 4:
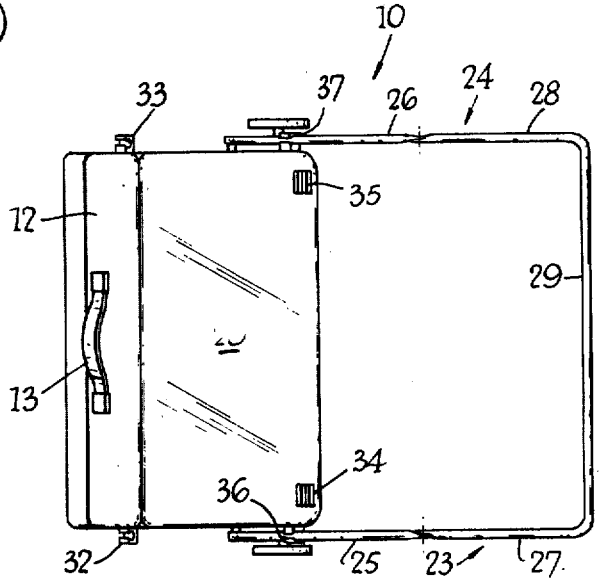
FIG. 4 is a plan view of FIG. 3.

If at any time the user wishes to transport other baggage, then the handle 29 is grasped and pulled away from the clips 34 and 35 so as to straighten the side bars 23 and 24. This action pivots the inner side bars 25 and 26 downwardly so that the wheels 15 and 16 project below the case 11 and rest on the ground. Two further clips 36 and 37 are provided on the side faces 17 and 18 of the case to engage and hold the inner side bars in the extended position shown in FIGS. 3 and 4 and the hinge joints between the inner and outer side bars are constructed in a well known manner (which is not shown) so that they lock in the straight position and can only be unlocked by jerking them into the bent position. When the framework 14 is in the locked open position, which is shown in FIGS. 3 and 4, the case 11 is supported on the free running wheels 15 and 16 and the side bars 23 and 24 and handle 29 extend outwardly and upwardly from the case 11 to form a wheeled trolley, with the case 11 forming the foot of the trolley.

Other packages or baggage can then be placed on the side bars and the case 11, which forms the foot of the trolley prevents the packages from sliding off the side bars.

Thus, it will be seen that the trolley 10 provides a light, easily portable suitcase which can quickly and easily be converted into a lightweight trolley for carrying other packages or baggage.

Figure 5:
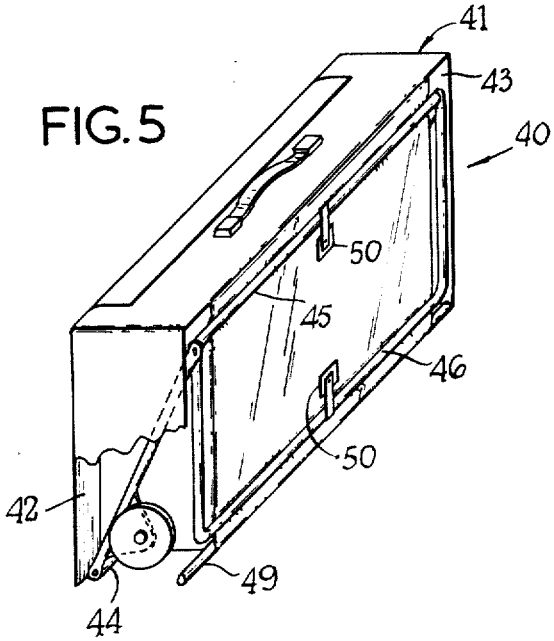
FIG. 5 is a perspective view, similar to FIG. 1 but showing a modification of the trolley.
Figure 6:
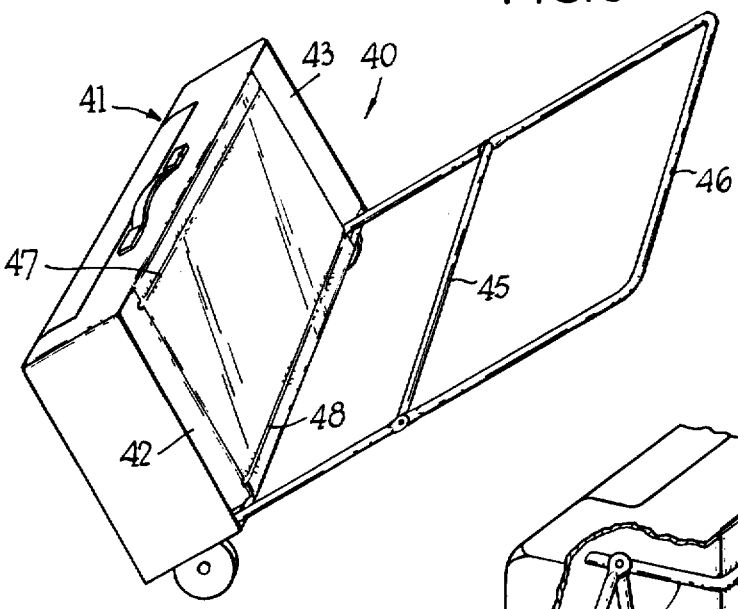
FIG. 6 is a perspective view of the trolley of FIG. 5 showing the framework in the open position and FIG. 7 is a perspective view of a detail of a modification of the trolley of FIGS. 5 and 6.

A modification of the trolley 10 is shown in FIGS. 5 and 6 and indicated generally therein at 40. The trolley 40 is generally similar to the trolley 10 but differs in that it comprises a case 41 having side pockets 42 and 43 forming recesses, which are each open on two sides and into which the wheels and framework are folded so as to be at least partially hidden from view when not in use. The inner side bars of the framework are pivoted on the ends of a single rod 44 which forms a part of the case 41 and the framework includes a stiffening cross-bar 45 which extends transversely between the side bars of the framework at the hinge point of the inner and outer side bars.

When the wheels and framework of the trolley 40 are folded away the cross bar 45 and handle 46 seat in grooves 47 and 48 respectively formed in the bottom face of the case 41. The grooves can, if required, be part-cylindrical so as to lightly grip the cross-bar and handle to hold the framework in the folded position and sliding catches 50 are provided to hold the cross bar 45 and handle 46 in the grooves.

In order to strengthen the structure of the trolley 40, a support rod 49 is provided in the case 41 and the ends of the rod 49 extend across the side pockets 42 and 43 to act as supports for the inner side bars when the framework is in the open position shown in FIG. 6. Clips are provided (not shown) on the ends of the rod 49 to lock the inner side bars in the open position shown in FIG. 6.

In all other respects, the trolley 40 is similar to the trolley 10 of FIGS. 1 to 4.

Figure 7:
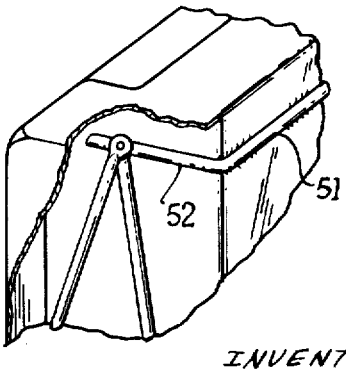

A modification of the trolley 40 is shown in FIG. 7 in which the framework includes a U-shaped cross-bar 51, the sides 52 of which locate in the folded position along the sides of the case and in the open position within the remainder of the framework where they are held by suitable clips. In all other respects the modified trolley of FIG. 7 is similar to the trolley 40.

It will be appreciated that the structure of the trolley of the present invention must be both light in weight so that it is easily portable but strong enough to carry a substantial load. To this end the framework is preferably formed from tubular aluminum and the case which forms the foot of the trolley can have a skeletal framework, also of tubular aluminum.

What I claim is:

1. A collapsible trolley comprising a case including an openable lid forming the foot of the trolley and a jointed framework pivotally attached externally to the case, said framework including two side bars each having inner and outer portions connected together and a cross bar joining the outer ends of the outer portions of the side bars, the inner ends of said inner portions of said side bars being pivotally mounted on the sides of said case, and a pair of axles extending transversely of and fixedly mounted on the inner portions of said side bars at a location spaced from said inner ends of said inner portions, a pair of wheels respectively pivotably mounted on said pair of axles for pivotal movement therewith, and means for selectively holding said framework in closed and opened positions, whereby the framework is pivotable into a closed position in which said side bars are collapsed and located at the sides of said case and said cross bar extends across a major face of said case and is pivotable into an opened position in which said wheels project below the case and said side bars project outwardly substantially normally from said major surface of said case in a locked condition to form a wheeled trolley with the case forming the foot of the trolley and adapted to retain luggage in place on the side bars of said framework.

2. A trolley as claimed in claim 1, wherein the inner portion of each side bar is pivotally mounted on a side of the case adjacent a bottom corner thereof and a fastener element is provided at the adjacent bottom corner of the side of the case for locking the inner portion of the side bar in the open position.

3. A trolley as claimed in claim 2, wherein a transverse stiffening bar is provided between the side bars at or adjacent to the hinge points of the inner and outer portions of the side bars, the transverse bar locating across the upper end of a major face of the case and the cross bar locating across the bottom end of the same major face of the case when the framework is in the closed, folded position.

4. A trolley as claimed in claim 3, wherein grooves are provided in the said major face of the case to accommodate the transverse bar and the cross bar.

5. A trolley as claimed in claim 4, wherein the cross bar is U-shaped.

6. A trolley as claimed in claim 5, wherein the case is provided with recesses at each side which are open on two sides to receive and house the framework and the wheels in the closed, folded position.

7. A trolley as claimed in claim 1, wherein the case is provided with recesses at each side which are open on two sides to receive and house the framework and the wheels in the closed, folded position.

*8. A combined portable case and collapsible trolley comprising:*

*a case formed by a plurality of walls with at least a part of a wall defining an openable lid,*

*an extendable trolley framework pivotally attached to the case and having a stored position compactly adjacent the case and rotatable about a pivot to an opened position extending substantially perpendicular from one wall of the case to form with the case a trolley for carrying luggage placed between the extended trolley framework and the one wall of the case, and*

*an extendable wheel assembly having a stored position compactly adjacent the case and an opened position projecting below the lowest corner of the case when the case is tilted to ground to allow the trolley to be wheeled with both the extended trolley framework and the one wall forming acute angles to ground.*

*9. The combined portable case and collapsible trolley of claim 8 wherein the extendable wheel assembly is mounted on the framework between the pivot and an opposite end thereof to thereby extend the wheel assembly when the framework is rotated from the stored position to the opened position.*

*10. The combined portable case and collapsible trolley of claim 8 wherein the extendable trolley framework includes a first bar connected to a second bar having a handle section for transporting the trolley tilted to ground, both the first bar and the second bar extend substantially perpendicular from the one wall of the case*

*to form with the case the trolley.*

*11. The combined portable case and collapsible trolley of claim 8 wherein the extendable trolley framework includes a bar pivotally attached to the case adjacent a corner thereof, and a stop element provides an abutment between the bar and the case when the bar is extended substantially perpendicular to the one wall to maintain the bar in the substantially perpendicular opened position.*

*12. A combined portable case and collapsible trolley comprising:*

*a case formed by a plurality of walls with at least a part of a wall defining an openable lid,*

*an extendable trolley framework attached to the case including a pair of spaced trolley bars which can be folded flat against one wall of the case, and the case has a pair of spaced grooves extending across the one wall for receiving the pair of spaced bars when folded flat against the case, the pair of spaced trolley bars having an opened position extending substantially perpendicular from the one wall of the case to form with the case a trolley for carrying luggage placed between the pair of spaced trolley bars and the one wall of the case, and*

*an extendable wheel assembly having a stored position compactly adjacent the case and an opened position projecting below the lowest corner of the case when the case is tilted to ground to allow the trolley to be wheeled with both the pair of trolley bars and the one wall forming acute angles to ground.*

*13. The combined portable case and collapsible trolley of claim 12 wherein the case is formed by a plurality of side walls joining a pair of major faces of the case, the one wall forming one major face and being opposite the wall defining the openable lid, said openable lid forming the other major face of the case, the lid facing towards the ground when the case is tilted to allow the trolley to be wheeled, and a case handle attached to one of the plurality of side walls for transporting the case when the trolley framework and wheel assembly are in the stored position.*

*14. The combined portable case and collapsible trolley of claim 8 wherein the openable lid forms at least a part of a major face of the case, and a face different than the major face includes recess means open to receive and house the trolley framework and the wheel assembly in the stored positions thereof.*

*15. A combined portable case and collapsible trolley comprising:*

*a case formed by plurality of walls with at least a part of a wall defining an openable lid,*

*an extendable trolley bar pivotally attached to the case and having a stored position compactly adjacent the case and rotatable about a pivot to an opened position in which the trolley bar extends substantially perpendicular to the case to form with the case a trolley for carrying luggage placed between the extended trolley bar and the case, and*

*a wheel assembly mounted on the trolley bar between the pivot and an end of the trolley bar, the wheel assembly being movable with rotation of the trolley bar from a stored position compactly adjacent the case to an opened position projecting below the case when the case is tilted to ground to allow the trolley to be wheeled with both the trolley bar and the case forming acute angles to ground.*

*16. The combined portable case and collapsible trolley of claim 15 wherein the trolley bar has a stop surface and is pivotally mounted adjacent at least two joining walls of the case, and a stop element is provided on the case for abutting the stop surface of the trolley bar when rotated to extend substantially perpendicular for locking the trolley bar in the opened position.*

*17. The combined portable case and collapsible trolley of claim 15 including a second extendable trolley bar pivotally attached to the case and having a stored position compactly adjacent the case and rotatable about a second pivot to an opened position in which the second trolley bar extends substantially perpendicular to the case and parallel with the first named trolley bar to form therewith a trolley for carrying luggage placed between the pair of extended trolley bars and the case, a second wheel assembly mounted on the second trolley bar between the second pivot and an end of the second trolley bar, a handle extending between the first named and second trolley bars, and a transverse bar spaced from the handle and extending between the first named and second trolley bars.*

*18. The combined portable case and collapsible trolley of claim 17 wherein the case has a pair of grooves located in one wall of the case to receive flat within the pair of grooves the handle and the transverse bar.*

*19. The combined portable case and collapsible trolley of claim 15 wherein the trolley bar includes a handle section, the openable lid forms at least a part of a major face of the case, and one or more faces different than the major face contain a first recess means to receive and store therein the handle section and a contiguous second recess means to receive and store the trolley bar and the wheel assembly in the stored positions thereof, the pivot being located in the second recess means.*

* * * * *

UNITED STATES PATENT OFFICE

CERTIFICATE OF CORRECTION

Patent No. Re. 28,757 Dated April 6, 1976

Inventor(s) Khalil Ahmad Ibrahim Cassimally

It is certified that error appears in the above-identified patent and that said Letters Patent are hereby corrected as shown below:

On the cover sheet the illustrative figure should appear as shown below:

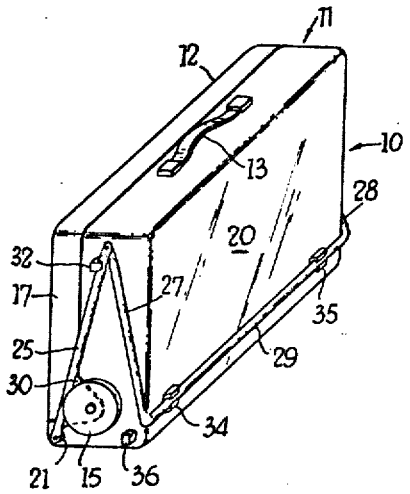

Signed and Sealed this twenty-ninth Day of June 1976

[SEAL]

Attest:

RUTH C. MASON
Attesting Officer

C. MARSHALL DANN
Commissioner of Patents and Trademarks